(12) United States Patent
Towle

(10) Patent No.: US 7,414,970 B2
(45) Date of Patent: *Aug. 19, 2008

(54) PROVISION OF STATIC QOS CONTROL USING DYNAMIC SERVICE BASED POLICY MECHANISMS

(75) Inventor: Thomas T. Towle, Naperville, IL (US)

(73) Assignee: Lucent Technologies Inc., Murray Hill, NY (US)

( * ) Notice: Subject to any disclaimer, the term of this patent is extended or adjusted under 35 U.S.C. 154(b) by 319 days.

This patent is subject to a terminal disclaimer.

(21) Appl. No.: 11/098,162

(22) Filed: Apr. 4, 2005

(65) Prior Publication Data

US 2006/0221822 A1    Oct. 5, 2006

(51) Int. Cl.
*G01R 31/08* (2006.01)
*G06F 11/00* (2006.01)

(52) U.S. Cl. .......... 370/230; 370/252; 370/341; 370/392; 455/435.1; 455/445; 455/452.2; 709/223; 709/229

(58) Field of Classification Search .......... 370/230, 370/252, 253, 331, 341, 392, 401; 455/435.1, 455/445, 452.2; 709/223, 229
See application file for complete search history.

(56) References Cited

U.S. PATENT DOCUMENTS

| | | | |
|---|---|---|---|
| 6,937,566 B1 * | 8/2005 | Forslow | 370/231 |
| 6,988,133 B1 * | 1/2006 | Zavalkovsky et al. | 709/223 |
| 7,027,818 B2 * | 4/2006 | Bos et al. | 455/452.2 |
| 7,120,156 B2 * | 10/2006 | Foti et al. | 370/401 |
| 2004/0073686 A1 * | 4/2004 | Hurta | 709/229 |
| 2005/0238002 A1 * | 10/2005 | Rasanen | 370/352 |

* cited by examiner

*Primary Examiner*—Matthew Anderson
*Assistant Examiner*—Shaima Q Aminzay

(57) ABSTRACT

An apparatus in one example may have: at least two endpoints operatively coupled to one another via an application function (AF) in a home network; a combined policy decision function (AAA-PDF) operatively coupled to the AF; a combined policy decision enforcement (PDE) operatively coupled to the one of the endpoints; the AAA-PDF operatively coupled to the PDE; and a QoS managed bearer that is operatively connected to the endpoints.

18 Claims, 3 Drawing Sheets

PROVISION OF STATIC QOS CONTROL USING DYNAMIC SERVICE BASED POLICY MECHANISMS

TECHNICAL FIELD

The invention relates generally to telecommunication systems and more particularly to a system in which authorization based on static QoS information from a subscription is combined with authorization based on dynamic QoS information.

BACKGROUND

The IP Multi-Media Subsystem (IMS) is an IP multimedia and telephony core network. It is defined by 3GPP and 3GPP2 standards and organizations based on IETF Internet protocols. IMS is access independent as it supports IP to IP session over wireline IP, 802.11, 802.15, CDMA, packet data along with GSM/EDGE/UMTS and other packet data applications. IMS is standardized reference architecture. IMS consists of session control, connection control and an applications services framework along with subscriber and services data. It enables new converged voice and data services, while allowing for the interoperability of these converged services between subscribers. IMS network infrastructure enables the convergence of data, speech, and mobile network technologies over an IP-based infrastructure.

Designed to fill the gap between existing traditional telecommunications technologies and the Internet, IMS provides the key functionalities required to enable new IP services via mobile networks taking into account the complexity of multimedia, constraints of the underlying network, managing mobility and the multitude of emerging applications. IMS permits and enhances real time, multimedia mobile services such as rich voice, video telephony, messaging, conferencing and push services by responding to the emerging trend to move toward a common, standardized subsystem. IMS services may include Push-to-Talk-over-Cellular, real time video sharing, interactive gaming, Instant Messaging Services, voice messaging, voice and video telephony, and video-conferencing.

Quality of service is commonly defined as the service users' degree of satisfaction during a given communications session. Consistently anticipating and meeting users' quality of service needs is what distinguishes successful communications service and product providers from their competition.

Network Services are considered end-to-end, this means from a Terminal Equipment (TE) to another TE. An End-to-End Service may have a certain Quality of Service (QoS), which is provided for the user of a network service. It is the user that decides whether he is satisfied with the provided QoS or not.

To realize a certain network QoS, a bearer service with clearly defined characteristics and functionality is to be set up from the source to the destination of a service. The bearer service includes all aspects to enable the provision of a contracted QoS. These aspects are among others the control signaling, user plane transport and QoS management functionality. A UMTS bearer service layered architecture may be used where each bearer service on a specific layer offers its individual services using services provided by the layers below.

Cellular telephony networks today are introducing higher bandwidth technologies in the access. Combined with higher access speeds, the core network is moving to using packet-based connectionless transports for services. With the advent of the IP Multimedia Subsystem (IMS), home based service control for multimedia applications is becoming a reality. Voice over IP (VoIP) and other QoS sensitive multimedia applications are being deployed and thus there is a new need for these applications to be able to manage their QoS needs.

The problem with the known architecture and operation is that they require two independent policy decisions to be made; first based on static information kept in the subscription database and second, based on dynamic information provided by the application function to the policy decision function. This two-step process limits the amount of flexibility available to the network operator in establishing policies regarding QoS use and creates additional complexity and the need for extra elements and provisioning in the network.

Thus, a need exists for an improved system that overcomes the drawbacks of the prior art.

SUMMARY

The invention in one implementation encompasses an apparatus. The apparatus comprises: at least two endpoints operatively coupled to one another via an application function (AF) in a home network; a combined policy decision function (AAA-PDF) operatively coupled to the AF; a combined policy decision enforcement (PDE) operatively coupled to the one of the endpoints; the AAA-PDF operatively coupled to the PDE; and a QoS managed bearer that is operatively connected to the endpoints.

Another implementation of the invention encompasses a method. This implementation of the method may comprise: endpoints communicating via an application function in the home network while negotiating the QoS for their end-to-end multimedia session; determining, by a combined policy element, policy based on subscription database information, information that it has received from the application function; providing, by the combined policy element, a policy decision to a policy enforcement function; responding, when the current policy is to allow, the policy enforcement function responds with a success to a terminal operatively coupled to one of the endpoints; and creating a bearer for end-to-end multimedia session.

DESCRIPTION OF THE DRAWINGS

Features of exemplary implementations of the invention will become apparent from the description, the claims, and the accompanying drawings in which:

DETAILED DESCRIPTION

Figure 1:
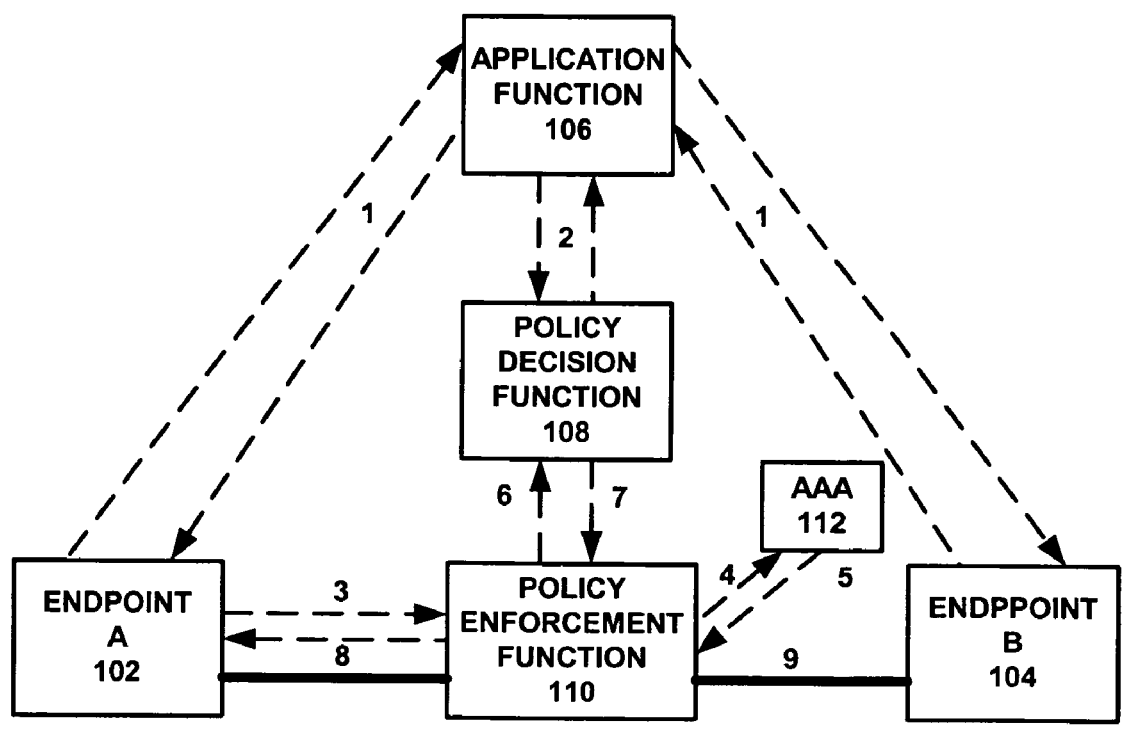
FIG. 1 is a representation of one known cellular system for QoS management.

The IP Multimedia Subsystem (IMS) is an enabler for many promising services based on the Internet Protocol (IP). Typically, the value-added IP services that will be offered through IMS are Quality of Service (QoS) sensitive. To support such services, the IMS architecture, defined in Third Generation Partnership Project (3GPP) release 5, introduces IMS-specific QoS mechanisms and service-based local policy control.

The IMS architecture adds functionality to the Universal Mobile Telecommunications System (UMTS) network, which is a true enabler for IP multimedia services, such as voice over IP, video and messaging services. This architecture relies on the concept of separating the IP data plane and the session control plane, based on the use of the Internet Engineering Task Force Session Initiation Protocol (IETF SIP), plus a minimum of 3GPP-specific SIP extensions accepted by the IETF. Support for IMS requires new network elements and interworking functions, such as the IMS-PSTN (Public Switched Telephone Network) interworking gateways. It also requires additional functionality in the User Equipment (UE).

The large scale introduction of IP multimedia services in the packet-switched domain puts additional demands on the QoS infrastructure provided by the UMTS bearer service. However, providing QoS to IMS services is not just a bearer level issue. Not only is there a need to involve the session layer in QoS control, but also to coordinate the bearer and session layer QoS.

Policy control enables an operator to control the user's access to network resources for IMS and non-IMS services, based on time-of-day, type of media, and so on. The PDF provides the capabilities needed to apply this service-based policy control in the UMTS access network.

In order to offer chargeable "carrier grade" services, it is important for an operator to correlate the QoS requested at the session layer (through session control signaling, such as SIP) with the actual QoS provided at the bearer level (PDP context activation). An important new feature of the IMS architecture is therefore the linkage between the session layer (SIP) and the UMTS bearer layer. For this purpose, the PDF is equipped with a policy control interface (Go), based on the Common Open Policy Service (COPS), which enables an operator to enforce policies on the PDP contexts in the GGSN.

The PDF is a policy decision point (in COPS terminology), while the GGSN hosts a policy enforcement function. The latter can police packet flows and restrict the set of IP destinations that can be reached through a PDP context according to packet filters. The binding between the media components specified at the session layer and the corresponding PDP contexts maintained at the GGSN, is ensured by using an authorization token. One authorization token is assigned per IMS (SIP) session; each media component (e.g. video or audio) in a SIP session is identified by a sequence number. The PDF has an interface with the Application Function (AF) on the service side and with the GGSN on the network side.

The AF controls applications that need to use IP bearer resources (e.g. UMTS packet-switched domain resources). It represents the application level intelligence for any service running over the IP bearer that needs service-based policy control.

The PDF makes policy decisions based on session and media related information obtained from the AF. At the heart of the PDF is a policy server, which stores the policy information; the granularity of this information is decided by the operator. For example, policy information can relate to all Access Point Names (APN) that are reachable via the UMTS network, or only to a given APN. Policy information is defined by the mobile operator.

The GGSN is the policy enforcement point for policy decisions made by the PDF. On receipt of connection requests (creation of PDP context), the GGSN sends requests and receives decisions from the PDF, the main functions of which are: authorization of session QoS resources; resource reservation; session release; and correlation of charging information.

In the initial interaction between the AF and the PDF, the AF provides the PDF with the media-related information (session requirements) to be used for the session. Based on the policy information contained in the policy server, the PDF authorizes (accepts or rejects) the use of QoS resources and provides the AF with the binding information to be used for PDP context creation.

When the GGSN receives a request for PDP context activation, it requests authorization from the PDF via the Go interface. The authorization token provided during the authorization of session QoS resources is used as the mechanism to enable the GGSN to contact the PDF that generated it. First, the PDF verifies that the PDP context activation request corresponds to an ongoing session. Second, it verifies that the requested bearer QoS corresponds to media resource information authorized by the AF. And third, it interacts with the GGSN to authorize the required QoS resources. The PDF provides the following information to the GGSN: QoS class to be used for the PDP context; data rate information authorized for the PDP context; and packet classifier.

The present method and apparatus may be utilized with other systems employing IMS as well as UMTS systems. For example, the present method and apparatus may be utilized with cdma2000 systems employing IMS.

In such a system (as shown in FIG. 1), the endpoints 102, 104 of a communications session, communicate via an Application Function (AF) 106 while negotiating the QoS for their end-to-end multimedia session (step 1). Once the negotiation is complete the AF 106 communicates with a Policy Decision Function (PDF) 108 to provide the negotiated QoS to use as a limit on the QoS requested by the user for this session (step 2). When the terminal A 102 makes a request to the Policy Enforcement Function (PEF) 110 for a QoS managed bearer (step 3), the request is first authorized based on static subscription policy information using the AAA function 112 (or other similar subscription database and authorization function such as the HSS). This authorization might be performed in real time (steps 4 & 5), or it might be performed based on information obtained at the time the terminal at the endpoint A 102 is attached to the current PEF 110.

If the request is authorized based on the subscription it is then checked with the PDF 108 (step 6) to see if it falls within the current policy as determined by the PDF 108 based on dynamic AF inputs and perhaps modulated by local network policy. The local network policy considerations may be based on resource utilization needs or roaming agreements in the case of roaming configurations. The PDF 108 provides the policy decision to the PEF 110 (step 7). If the current policy is to allow the flow, the PEF 110 responds with a success to the terminal at the endpoint A 102 (step 8) and the bearer is then created (step 9).

The configuration and operation according to the present method and apparatus combines currently independent functions into a single function. The authorization based on static QoS information from the subscription is combined with the authorization based on dynamic QoS information provided by an Application Function (AF). In the case where no Application Function information is provided an additional capability over today's systems is available by allowing the subscription based QoS information to be checked against local policy information based on current utilization and thus perhaps modifying the authorization results. This provides for a decrease in the complexity of the network, a reduction of network elements and in the overall burden of provisioning the network. In addition the operation with the new configuration reduces the number of interactions that might be necessary to authorize QoS enabled bearers in a cellular network while at the same time providing new capabilities.

In the architecture according to the present method and apparatus, the Policy Decision Function (PDF) is merged with the AAA to support a single set of interactions for authorization of QoS enabled bearers against both static and dynamically established policy.

Figure 2:
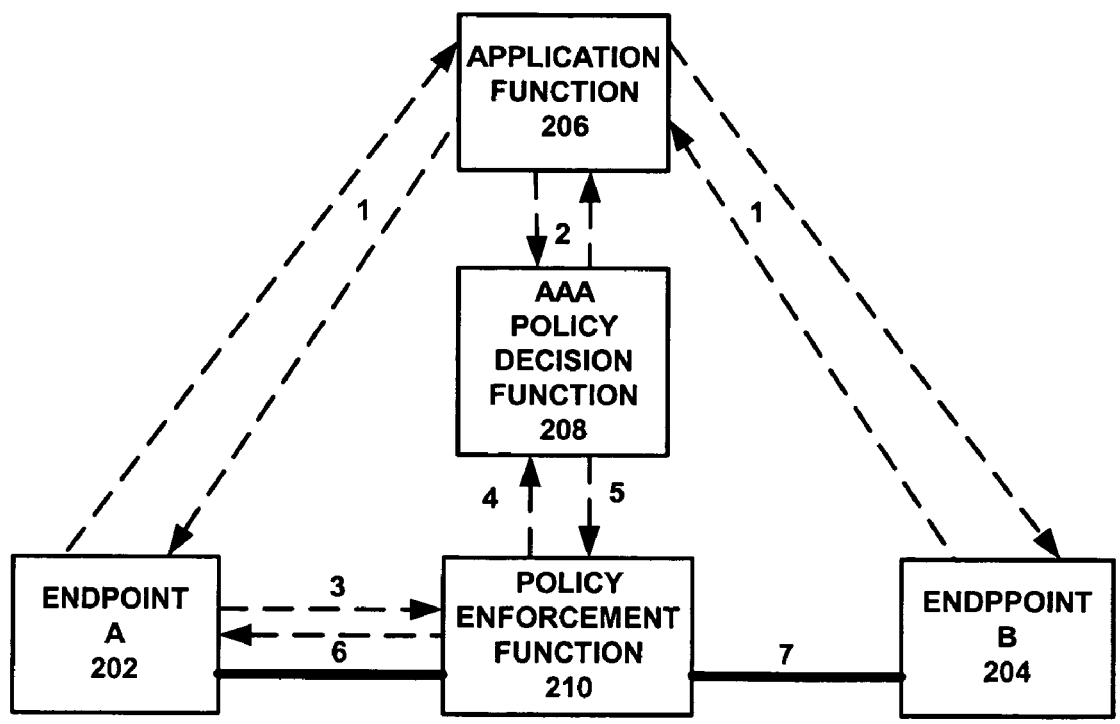
FIG. 2 is a representation of one implementation of an apparatus that implements authorization based on static QoS information from a subscription combined with authorization based on dynamic QoS information.

FIG. 2 shows the overall operation of this new configuration for Static And Dynamic Policy (SADP) control based authorization. In such a system, the endpoints 202, 204 of a communications session, still communicate via an Application Function (AF) 206 in the home network while negotiating the QoS for their end-to-end multimedia session (step 1). Once the negotiation is complete the AF 206 communicates with the AAA-policy decision function (AAA-PDF) 208 to provide the negotiated QoS to use as a limit on the QoS requested by the user for this session (step 2).

When a terminal at one of the endpoints, such as endpoint A 202, makes a request to the Policy Enforcement Function (PEF) 210 for a QoS managed bearer (step 3), the request is just checked with the AAA-PDF 208 to see if it falls within the current policy (step 4). As a combined policy AAA element, the AAA-PDF 208 makes the policy determination based on subscription database information, information that it has received from the AF 206, and based on any local policy information that it might have. The local network policy considerations might be based on resource utilization needs or roaming agreements in the case of roaming configurations. The AAA-PDF 208 then provides the policy decision to the PEF 210 (step 5). If the current policy is to allow the flow, the PEF 210 responds with a success to the terminal at the endpoints A 202 (step 6) and the bearer is then created (step 7).

Figure 3:
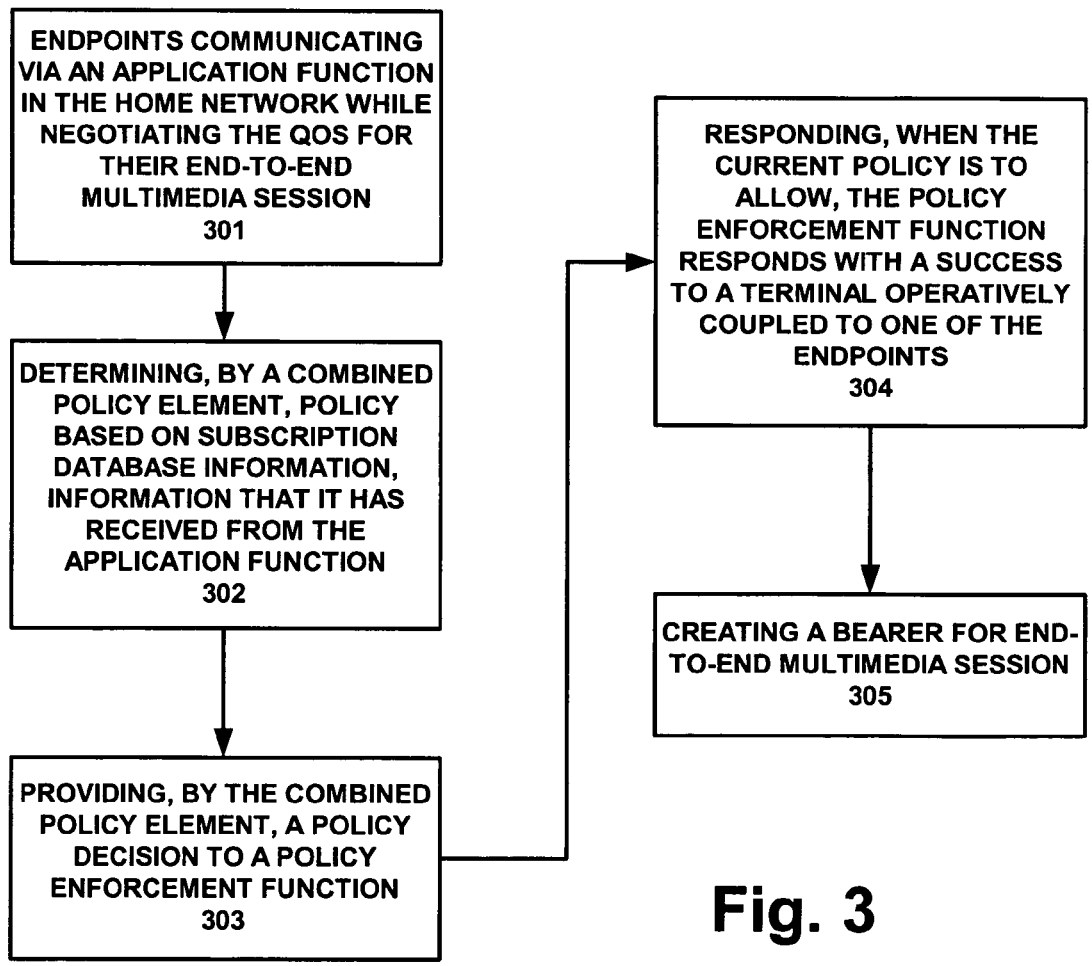
FIG. 3 is a representation of one exemplary method for use with the FIG. 2 embodiment.

FIG. 3 depicts a flow diagram of one exemplary embodiment of the present method. In this exemplary embodiment the method may have the following steps: endpoints communicating via an application function in the home network while negotiating the QoS for their end-to-end multimedia session (301); determining, by a combined policy element, policy based on subscription database information, information that it has received from the application function (302); providing, by the combined policy element, a policy decision to a policy enforcement function (303); responding, when the current policy is to allow, the policy enforcement function responds with a success to a terminal operatively coupled to one of the endpoints (304); and creating a bearer for end-to-end multimedia session (305).

Thus, embodiments of the present method and apparatus fulfill the need in the art for system in which authorization based on static QoS information from a subscription is combined with authorization based on dynamic QoS information provided by an application function.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. An apparatus, comprising:
    at least two endpoints operatively coupled to one another via an application function (AF) in a home network;
    a combined policy decision function (PDF) operatively coupled to the AF;
    a combined policy decision enforcement (PDE) operatively coupled to the one of the endpoints;
    the PDF operatively coupled to the PDE; and
    a quality of service (QoS) managed bearer that is operatively connected to the endpoints;
    wherein QoS requested at a session layer is correlated with actual QoS provided at a bearer layer using a linkage between the session layer and the bearer layer, and
    wherein authorization for the managed QoS bearer based on static QoS information from a subscription database is combined with authorization based on dynamic QoS information, and
    wherein subscription based QoS information is checked against local policy information based on a current utilization when application function information is not provided.

2. The apparatus according to claim 1, wherein the endpoints communicate via the application function (AF) in the home network while negotiating a QoS for the end-to-end multimedia session.

3. The apparatus according to claim 1 wherein the AF communicates with the PDF to provide a negotiated QoS for the end-to-end multimedia session.

4. The apparatus according to claim 1, wherein the PDF makes a policy determination based on at least one of information that the PDF has received from the AF and subscription database information.

5. The apparatus according to claim 4, wherein the PDF makes a policy determination based on information that the PDF has received from the AF, subscription database information and local policy information possessed by the PDF.

6. The apparatus according to claim 5, wherein the local network policy considerations are based on at least one of resource utilization needs and roaming agreements for roaming configurations.

7. The apparatus according to claim 1, wherein the PEF initiates establishment of the QoS managed bearer by communicating directly with a cellular terminal at one of the endpoints.

8. A method, comprising the steps of:
    endpoints communicating in a network while negotiating the Quality of Service (QoS) for an end-to-end multimedia session; and
    merging a policy decision function (PDF) with a combined policy decision function to support a single set of interactions for authorization of QoS enabled bearers for the end-to-end multimedia session;
    wherein QoS requested at a session layer is correlated with actual QoS provided at a bearer layer using a linkage between the session layer and the bearer layer, and
    wherein authorization for the managed QoS bearer based on static QoS information from a subscription database is combined with authorization based on dynamic QoS information, and
    wherein subscription based QoS information is checked against local policy information based on a current utilization when application function information is not provided.

9. The method according to claim 8, wherein the method further comprises the steps of:
    the endpoints communicating via an application function (AF) in a home network while negotiating the QoS for an end-to-end multimedia session;
    determining, by a combined policy element, policy based on subscription database information, information that it has received from the application function;
    providing, by the combined policy element, a policy decision to a policy enforcement function;

responding, when the current policy is to allow, the policy enforcement function responds with a success to a terminal operatively coupled to one of the endpoints; and creating a bearer for end-to-end multimedia session.

10. The method according to claim 9, wherein, when a request is made to the policy decision function for a QoS managed bearer, the request is checked with the combined policy element to see if the request falls within a current policy as determined by the policy decision function, the policy decision function based on dynamic application function inputs and modulated by local network policy.

11. The method according to claim 10, wherein the local network policy considerations are based on at least one of resource utilization needs and roaming agreements for roaming configurations.

12. The method according to claim 9, wherein the PDF makes a policy determination based on at least one of information that the PDF has received from the AF and subscription database information.

13. The method according to claim 9, wherein the PDF makes a policy determination based on information that the PDF has received from the AF, subscription database information and local policy information possessed by the PDF.

14. A method, comprising the steps of:
  endpoints communicating via an application function (AF) in a home network while negotiating a Quality of Service (QoS) for an end-to-end multimedia session;
  determining, by a combined policy element, policy based on subscription database information, information that it has received from the application function;
  providing, by the combined policy element, a policy decision to a policy enforcement function;
  responding, when the current policy is to allow, the policy enforcement function responds with a success to a terminal operatively coupled to one of the endpoints; and
  creating a bearer for end-to-end multimedia session;
  wherein QoS requested at a session layer is correlated with actual QoS provided at a bearer layer using a linkage between the session layer and the bearer layer, and
  wherein authorization for the managed QoS bearer based on the subscription database information is combined with authorization based on dynamic QoS information, and
  wherein subscription based QoS information is checked against local policy information based on a current utilization when application function information is not provided.

15. The method according to claim 14, wherein, when a request is made to a policy decision function for a QoS managed bearer, the request is checked with the combined policy element to see if the request falls within a current policy as determined by the policy decision function, the policy decision function based on dynamic application function inputs and modulated by local network policy.

16. The method according to claim 14, wherein the local network policy considerations are based on at least one of resource utilization needs and roaming agreements for roaming configurations.

17. The method according to claim 14, wherein a policy decision function (PDF) makes a policy determination based on at least one of information that the PDF has received from the AF and subscription database information.

18. The method according to claim 14, wherein a policy decision function (PDF) makes a policy determination based on information that the PDF has received from the AF, subscription database information and local policy information possessed by the PDF.

* * * * *